Jan. 22, 1963  S. S. GOLDBERG ET AL  3,075,145
MAGNETIC DETECTION OF FLAWS USING MUTUALLY COUPLED COILS
Filed Nov. 25, 1958
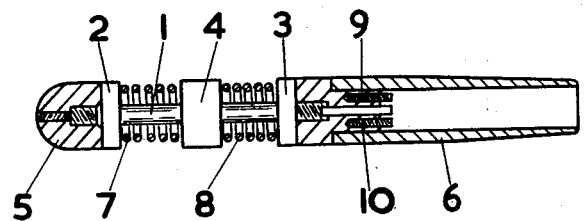
FIG. 1.
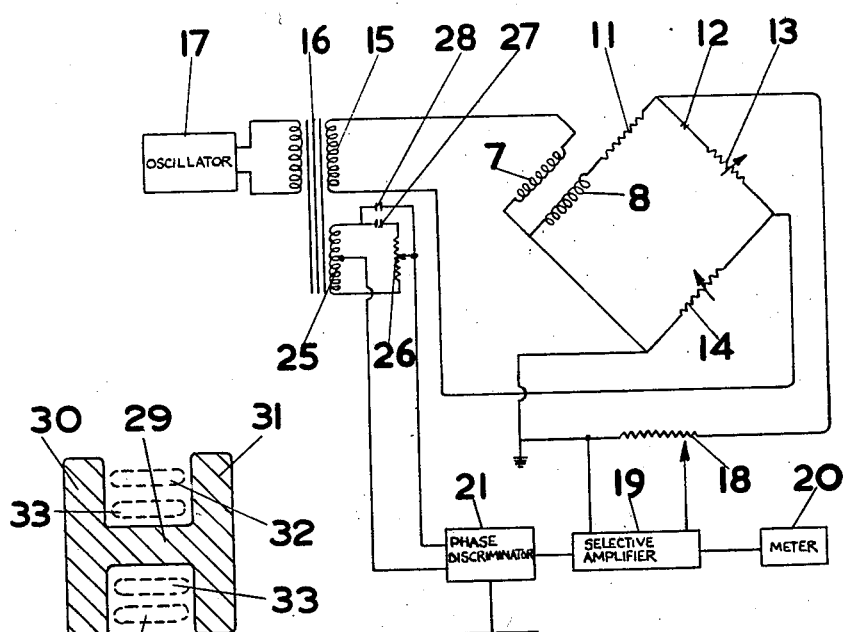
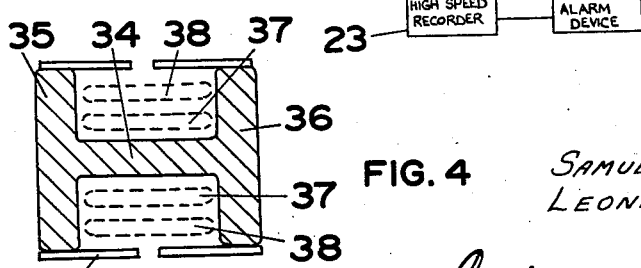
INVENTORS
SAMUEL SIDNEY GOLDBERG
LEONARD THOMAS PERRIAM
BY Cushman, Darby & Cushman
ATTORNEYS United States Patent Office 3,075,145
Patented Jan. 22, 1963

3,075,145
MAGNETIC DETECTION OF FLAWS USING
MUTUALLY COUPLED COILS
Samuel Sidney Goldberg and Leonard Thomas Perriam, Birmingham, England, assignors to Imperial Chemical Industries Limited, London, England, a corporation of Great Britain
Filed Nov. 25, 1958, Ser. No. 776,309
Claims priority, application Great Britain Nov. 28, 1957
6 Claims. (Cl. 324—37)

This invention is concerned with the non-destructive testing for flaws in metals, and is particularly concerned with the detection of flaws in tubular metal elements such as boiler or condenser tubes, without damaging the tubes.

It has hitherto been customary to detect flaws in condenser tubes by the use of a probe device which comprises a core of magnetic material provided with three axially-spaced radially-extending flanges of magnetic material. Two insulated coil elements are co-axially wound around the core, so that each coil is disposed between a pair of flanges. One such probe device is described in the complete specification of United Kingdom Patent No. 597,798.

In use the two coils are connected in series with an energising current supply and one coil forms one of the arms of an electrical measuring-bridge circuit and the other coil forms another of the arms of the measuring bridge circuit. According as to whether the probe device is to be used solely for the detection of flaws in the metal or for the detection not only of flaws but also of those parts of the tube whose wall thickness has been reduced by corrosion (which can also be regarded as a flaw in the metal) the magnetic fields of the two coils are identical or different.

When the probe device is so used, the accuracy of the results obtained is limited by several factors. For instance, in order to discriminate between adjacent flaws it is desirable for the gap between the two coils to be small. However, with small gaps between the two coils it is not possible to move the probe device quickly along a tube under examination since, otherwise, the acceleration of the device creates what may be termed as a "drag-field" effect, which gives an error signal having a magnitude proportional to speed.

The accuracy of the measurement of tube wall-thickness is also affected by the initial and exit kick caused by the probe passing into and out of a thinned area, which can be regarded as a "shoulder effect."

Twin coil inspection which compares the metal loss under each coil must give a smaller deflection when the coils are wholly within the thinned area, than in the transition between thick and thinned areas.

An abrupt transition between a thick and thinned area gives an abrupt kick on the trace deviation of the thinned area. This shoulder effect makes an estimation of the severity of local erosion, i.e. cavitation erosion, horseshoe impingement attack etc., extremely difficult, since the magnitude of the trace deflection is not proportional to the change in the wall thickness which has occurred.

When the volume of metal loss is a comparison between the loading effects on each coil of the twin coil system, the record of a badly pitted tube could easily be misleading if the metal loss under each coil is such that it produces a cancellation of the error signal from each.

This in fact does occur, and a series of holes spaced exactly the same distance apart as the coil centres of balanced coils would be invisible due to this cancellation effect. Happily this effect is rare, but it does mean that the trace record of a badly corroded tube must be treated as a general indication of its condition and not a precise measurement of the location and extent of pitting of the tube wall.

According to this invention, there is provided a method for the non-destructive detection of flaws in metals by means of a probe device having two coils wound on a core of magnetic material in which the two coils are connected in series with an energising current source and one of the coils forms the arm of an electrical measuring-bridge circuit. The magnetic fields of the two coils may be identical or different.

With such a method, the two coils are mutually coupled together and the output from the bridge circuit is determined by the change in mutual inductance between the two coils instead, as in previous methods, by changes of twin self-inductance.

In the accompanying drawings, FIGURE 1 is a sectional view of a probe device and FIGURE 2 is a circuit arrangement suitable for carrying out one method in accordance with the invention. FIGURES 3 and 4 are sectional views of alternative probe devices.

Referring to FIGURE 1 of the drawings, the probe device comprises a central core 1 of magnetic material having end flanges 2 and 3 and a central flange 4, the flanges also being of magnetic material. One end of the device has a dome-shaped nose-cap 5 which allows the device easily to be inserted in and moved along a condenser tube or other tubular member. The other end of the device has an insulated handle or tail-piece 6 by which the device can be held and through which electrical lead wires of an external electrical circuit may be passed.

A coil 7 is wound between the flanges 2 and 4, and an identical coil 8, that is to say, one having the same electrical and magnetic properties as the coil 7, is wound between the flanges 4 and 3. One end of coil 7 is connected to an electrical connection 9, one end of coil 8 is connected to an electrical connection 10, and the remaining ends of the two coils are connected together and to the core. The electrical connections 9 and 10 are carried by the handle 6.

Referring now to FIGURE 2, an electrical measuring-bridge circuit is formed by coil 8, resistor 11, condenser 12, variable resistor 13 and variable resistor 14. Electrical connection 9 is connected to a secondary winding 15 of a transformer 16 forming part of an oscillator 17, the other end of the secondary winding being connected to the junction between resistors 13 and 14.

The output from the bridge circuit is fed to variable resistor 18 which forms part of the input circuit of a selective amplifier 19. The output circuit from the amplifier may be switched to a measuring device 20, which is used for bridge-balancing purposes, or it may be switched to a phase discriminator apparatus 21 which in turn is connected to a direct current amplifier 22. The amplifier is connected to a high-speed recorder 23 of the pen type and to an alarm device 24. The phase discriminator is also connected to a secondary winding 25 of the transformer 16, by way of a circuit including a variable resistor 26 and condensers 27 and 28.

We have found that when the probe device forms part of such a circuit and is drawn along a tube under examination, a high degree of accuracy and ease of interpretation of the indications of flaws and thinning is obtained. Furthermore, the devices may be drawn along the tube at high speed and there is at least a marked reduction in the shoulder effect.

An alternative probe device, which is suitable for use with the bridge circuit shown in FIGURE 2, is shown in FIGURE 3. The probe device comprises a magnetic former having a core 29 and two flanges 30 and 31. A coil 32 is wound around the core 29 and a further coil 33 is wound around the coil 32. The two coils are connected in series and correspond to the coils 7 and 8 shown in FIGURES 1 and 2.

Another alternative probe device, which is also suitable for use with the bridge circuit shown in FIGURE 2, is shown in FIGURE 4. This probe device comprises a core 34 of magnetic material and two flanges 35 and 36 of magnetic material. A coil 37 is wound around the core 34 and extends between the flanges. A coil 38 is wound around the coil 37. The length of the magnetic field external to the flanges is restricted by cylindrical pole pieces 39 and 40 of magnetic material. The two coils are connected in series and correspond to the coils 7 and 8 shown in FIGURES 1 and 2.

It will be appreciated that, compared with the probe device shown in FIGURE 1, the mutual inductance of the two coils employed in either of the probe devices shown in FIGURES 3 and 4, is increased, whilst the effective change in mutual inductance due to change in wall thickness of a cylindrical tubular metal object into which the probe device is inserted will be reduced. Furthermore, whilst the sensitivity to changes in wall thickness is reduced, the sensitivity to abrupt changes in the resistivity of the object due to flaws or holes is maintained or increased.

Although in the embodiment described above, the probe device is designed for being drawn within a tube, the method can be employed with probe devices which are adapted to be drawn over the external surface of a tube.

We claim:

1. Apparatus for nondestructively magnetically testing elongate metallic articles for flaws comprising: a probe device speedily movable relative to a said article under test and including, to the exclusion of any article to be or being tested, a core carrying two mutually coupled coils each having two ends with said coils being serially connected via one of said ends of each coil; an alternating current source serially connected to the other end of one of said coils; and an electrical bridge circuit having a part coupled across the serial combination of said one coil and source with said bridge circuit otherwise including as between said two coils only the other thereof for effecting a measurement of the mutual inductance between said coils.

2. Apparatus as in claim 1 and further including a phase discriminator coupled to the output of said bridge circuit and means coupled between said current source and discriminator for providing to the latter a phase reference potential to cause the output of the discriminator to be proportional to the magnitude and phase difference between said reference potential and the input to the discriminator from the bridge circuit.

3. Apparatus as in claim 1 wherein the said two coils are disposed side by side about said core.

4. Apparatus as in claim 1 wherein one of the said two coils is wound around the other.

5. Apparatus as in claim 4 and further including magnetic material associated with said core and substantially completely surrounding said coils except for an air gap substantially narrower than the axial length of the coils for concentrating the magnetic field therefrom.

6. Apparatus for nondestructively magnetically testing elongate metallic tubes for flaws comprising: a probe device speedily movable within and relative to a said tube under test and including, to the exclusion of any tube to be or being tested, a core of magnetic material having three radially extending spaced flanges of magnetic material, two insulated coil elements wound around said core connected in series with one another, one coil element being disposed between one pair of flanges and the other coil element being disposed between the other pair of flanges; an alternating current source serially connected to one of said coils; and an electrical bridge circuit having a part coupled across the serial combination of said one coil and source with said bridge circuit otherwise including as between said two coils only the other thereof for effecting a measurement of the mutual inductance between said coils.

References Cited in the file of this patent
UNITED STATES PATENTS

| | | |
|---|---|---|
| 2,455,792 | Meunier | Dec. 7, 1948 |
| 2,508,494 | Cook et al. | May 23, 1950 |
| 2,540,589 | Long | Feb. 6, 1951 |
| 2,811,690 | Sargent | Oct. 29, 1957 |
| 2,927,266 | Richter | Mar. 1, 1960 |